United States Patent [19]

Norman

[11] Patent Number: 4,482,648

[45] Date of Patent: Nov. 13, 1984

[54] FOAMED INK COMPOSITION AND METHOD OF MAKING THE SAME

[75] Inventor: Edward C. Norman, Chester Springs, Pa.

[73] Assignee: Foamink Company, Inc., Fall River, Mass.

[21] Appl. No.: 419,232

[22] Filed: Sep. 17, 1982

Related U.S. Application Data

[63] Continuation-in-part of Ser. No. 360,757, Mar. 22, 1982, abandoned.

[51] Int. Cl.³ .............................................. C08J 9/30
[52] U.S. Cl. .................................... 521/65; 521/84.1; 521/86; 521/88; 521/187; 521/70
[58] Field of Search .................. 106/20, 25; 521/84, 521/70, 65

[56] References Cited

U.S. PATENT DOCUMENTS

| | | | |
|---|---|---|---|
| 2,971,458 | 2/1961 | Kumins et al. | 521/64 |
| 3,400,658 | 9/1968 | Gagliardi et al. | 101/170 |
| 3,729,460 | 4/1973 | Patton | 106/25 |
| 4,050,944 | 9/1977 | Cartawright | 106/19 |
| 4,118,526 | 10/1978 | Gregorian et al. | 427/350 |
| 4,208,173 | 6/1980 | Gregorian et al. | 8/477 |
| 4,266,976 | 5/1981 | Gregorian et al. | 8/477 |
| 4,299,591 | 11/1981 | Gregorian et al. | 8/477 |
| 4,334,877 | 6/1982 | Gregorian et al. | 8/477 |
| 4,347,145 | 8/1982 | Gregorian et al. | 8/477 |

*Primary Examiner*—Morton Foelak
*Attorney, Agent, or Firm*—Thompson, Birch, Gauthier & Samuels

[57] ABSTRACT

A foamable ink composition which comprises a water-based printing ink, a foaming agent and a pseudoplastic additive. The ink, foaming agent and pseudoplastic additive are foamed with a compressed gas. The pseudoplastic additive aids in the mixing of the ink with the gas and enhances the stability of the foam. The foam is especially adapted for application to a gravure cylinder where it is doctored to convert the foam bubbles into thin discrete membranes spanning the gravure cells. These membranes then are transferred, either directly or indirectly to a moving web.

31 Claims, 1 Drawing Figure

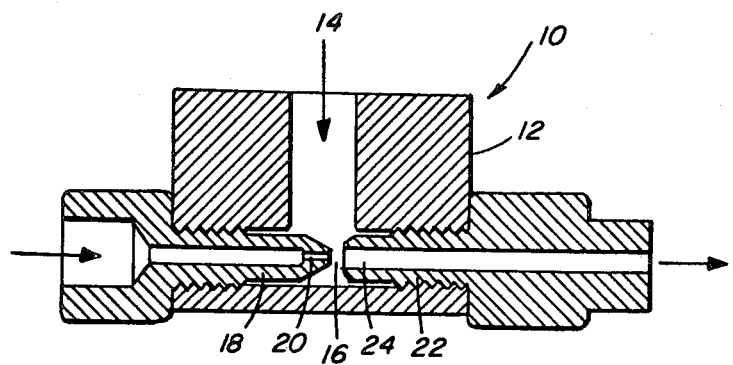

FOAMED INK COMPOSITION AND METHOD OF MAKING THE SAME

REFERENCE TO RELATED APPLICATION

This application is a continuation-in-part of U.S. Ser. No. 360,757 filed Mar. 22, 1982, now abandoned.

BACKGROUND OF THE INVENTION

1. Field of the Invention

This invention relates generally to the printing of moving webs and is concerned in particular with water-based foamable ink printing composition and a method of making the same.

2. Description of the Prior Art

The invention is especially useful in, although not limited to, the rotogravure printing of paper webs. Since its inception in the late 1800's, rotogravure printing has been carried out primarily with solvent based inks. The solvents are toxic and highly flammable, and consequently printing plant personnel are exposed continuously to potentially serious health, fire and explosion hazards. As a result, in spite of the implementation of elaborate and expensive protective measures such as for example solvent recovery and air pollution abatement systems, electrically grounded presses, shielded electric motors, etc., insurance costs remain extremely high. Moreover, because solvents are extracted from petroleum, their costs have increased dramatically during the last decade, as has the cost of the energy consumed by the dryers required to dry solvent inks after printing.

It has been suggested to coat or print a web of cloth, paper or the like with a water-based foamed ink. U.S. Pat. No. 2,971,458, Kumins, is believed to be the most relevant prior art. This reference teaches the foaming of water-based inks by conventional foaming devices such as mechanical mixers, followed by transfer of the foamed ink into the cells of a gravure cylinder and subsequent transfer of the foamed ink from the cells of the cylinder to a web to be printed. Further in this reference, the disclosed compositions include additives to enhance stability, but no additive is taught which is used both to enhance the mixing of the composition during foaming and to control the fluidity and stability of the ink once foamed.

Although this reference suggests the use of a water-based foamed ink for the printing of a moving web of paper, there presently is no economically successful commercial implementation of this suggestion.

SUMMARY OF THE INVENTION

The present invention is directed to a water-based foamable ink composition and more particularly, to a composition having physical properties which make it especially suitable for foaming and subsequent application to a gravure-type cylinder where it is doctored to convert the foam bubbles into thin discrete membranes overlying the gravure cells, with the cell volumes underlying the membranes as well as the cylinder and areas separating the cells being subsequently free of ink, thus facilitating the subsequent transfer of the membranes onto a moving paper web. The foaming step does not require the use of mechanical agitation.

In a preferred embodiment, the composition prior to foaming is a water-based liquid, which comprises: a pigment, a resin, a foaming agent or a blended foaming agent and a wetting agent, and, optionally, a 'stabilizer' as hereinafter defined, and most importantly, a psuedoplastic additive. Additives such as fungistats, bacteriostats, etc. which impart to the web desired characteristics also may be used.

Broadly, the pseudoplastic additive will impart to the composition a viscosity which is reduced by a factor of between about 10 to 20,000 when mixed with a compressed gas and which imparts to the foamed ink a desired fluidity. Preferably, the pseudoplastic additive is a polysaccharride.

The foamable composition is mixed with a compressed gas, such as air in an expansion ratio (gas-to-formulation-ratio) of from 3 to 20, say for example, an expansion ratio of between 6 to 12 by volume. The mixing of the composition and air is effected in a chamber devoid of mechanical agitation. The gas is discharged from a nozzle. The discharge of the nozzle is in communication with a chamber and a receiver. The composition is introduced into the chamber. The gas mixes with and carries the composition from the chamber and into the receiver; the composition in the receiver nozzle having the gas dispersed therein to form a mixture. The mixture is discharged from the receiver into a foam refining tube ultimately forming a foamed ink. The foamed ink is coated onto a gravure type cylinder where it is doctored, causing the foam to be converted into thin discrete membranes of ink composition spanning the gravure cells. These membranes are ultimately brought into contact with either a moving web or another roll, causing the pigment in the ink membranes to be transferred to the web or other roll. The membrane may or may not include microbubbles, however, it is believed to be essentially a liquid film.

The foamed ink composition has a surface tension of between about 15 to 40 dynes cm$^{-1}$ and a 25% drainage time (NFPA Std 11, 1978, p. 11–98) of between about 12 minutes to 4 hours.

In a particularly preferred embodiment where no 'stabilizer' is used, the composition has marked fluidity with a 25% drainage time of between about 8 minutes to 1 hour. The composition on drying does not dry to a ghost foam; but rather, the foam collapses holding the liquid ink interstitially. The collapsed foam can be re-foamed simply by mechanical agitation.

BRIEF DESCRIPTION OF THE DRAWING

The drawing is a side sectional view of a nozzle-mixing chamber assembly.

DESCRIPTION OF THE PREFERRED EMBODIMENT

The foamable ink composition broadly comprises a printing ink, a resin, a foaming agent and a pseudoplastic additive. Optionally foam stabilizers and/or wetting agents may be used.

Specific suitable and utilizable aqueous pigment dispersions are: Super Imperse Phthalo blue 2663-Ciba-Geigy, Aurasperse Diarylide Yellow W-1041, Aurasperse Barium Lithol Red W-3161, and Aurasperse Carbon Black W-7012, Harshaw Chemical Co.; Flexo PLUS Diarylide Yellow WY-7714, Flexo PLUS Barium Lithol Red WR-7749, and Flexo PLUS Phthalo Blue WB-7715, Mobay Chemical Corp.; Flexiverse Diarylide Yellow TFD-1123, Flexiverse Barium Lithol Red RFD-1135, and Flexiverse Phthalo Blue BFD-1121, Sun Chemical Corp. These pigment dispersions may be used as is, or various combinations thereof may be employed to obtain various color and shade possibilities.

Aqueous pigment dispersions which are commercially available with pH ranges of from about 8 to about 12 are preferred, inasmuch as such will obviate the necessity of adjusting their pH values to such a range, prior to their use. Also, the dispersions may have 30-60% solids by weight.

Resins that may be successfully employed in the invention are water soluble or water dispersable with the appropriate vehicle.

Specific utilizable resins include: Joncryl 678SC, S. C. Johnson & Sons Co. (acrylic); SC 5011, Stanchem Corp. (acrylic); Rhoplex AC 33, Rohm and Haas (acrylic); CL 202, Celanese Plastic Company (polyvinylacetate latex); and Vinac ASB, Air Products & Chemical Co. (pva); Cymel 200, 300, 400, 500 Series, American Cyanamide (melamine resins). These resins may be supplied as emulsions or solutions and vary from 20 to 60% solids, or in some instances may be 100% solids.

The foaming agent used is selected to produce a foamable ink composition which will retain its stability until coating of the foamed ink is doctored after being applied to a gravure-type cylinder, at which time the foam bubbles are converted to discrete membranes spanning the cells of the gravure cylinder. After this conversion, the cell volumes underlying the membranes as well as the cylinder land areas separating the cells are substantially free of ink, and the membranes are readily transferrable to any other surface brought into contact therewith. In rotogravure printing, this other surface will comprise one face of a moving web, whereas in flexographic printing, the other surface can comprise the surface of an intermediate transfer roll.

For a foaming agent any surface active agent can be used which will produce a foam having the characteristics herein described. The composition is foamed in a foaming apparatus to produce the novel foams of this invention, using air or any inert gaseous material. The amount of gas that is used to foam the composition can be as much as 20 times or as little as 3 times and is generally about 8 to 12 times the volume of the liquid formulation that is to be foamed.

Suitable foaming agents include the ethylene oxide adducts of the mixed $C_{11}$ to $C_{15}$ linear secondary alcohols which contain from about 10 to 50 ethyleneoxy units, preferably from about 12 to 20 ethyleneoxy units in the molecule. Also, the ethylene oxide adducts of the linear primary alcohols having from 10 to 16 carbon atoms in the alcohol moiety, or of the alkyl phenols wherein the alkyl group has from 8 to 12 carbon atoms, wherein the adducts can have from about 10 to about 50, preferably from about 12 to 20 ethyleneoxy units in the molecule. Also useful are the fatty acid alkanolamides such as coconut fatty acid monoethanolamide. Another suitable class of foaming agents is the group of sulfosuccinate ester salts, such as disodium N-octadecylsulfosuccinate, tetrasodium N-(1,2-dicarboxyethyl)-N-octadecylsulfonsuccinate, diamyl ester of sodium sulfoccinic acid, dihexylester of sodium sulfosuccinic acid, dioctyl ester sodium sulfosuccinic acid, and the like. In addition to the above nonionic and anionic surfactants one can also use a cationic surfactant or an amphoteric surfactant, N-coco-beta-aminopropionic acid (of the N-tallow or N-lauryl derivatives) or the sodium salts thereof, stearyl dimethyl benzyl ammonium chloride, the betaines or quaternized tertiary alkylamines. These are well known and any similar surfactant can be used in addition to those specifically identified above. Blends of one or more surfactants are often used to advantage. Particularly preferred foaming agents are sodium lauryl sulfate and sodium lauryl ether sulfate in a range of 0.1 to 6% solids by weight.

Suitable foam stabilizers are used in some of the formulas and include the higher fatty alcohols such as decyl alcohol, lauryl alcohol, tetradecyl alcohol, cetyl alcohol, oleyl alcohol and stearyl alcohol, the higher alkyl mono-ethers of etylene glycol, diethylene glycol, propylene glycol, and dipropylene glycol (such as cetyl diethylene glycol ether), fatty monoglycerides such as glycerol monolaurate and clycerol monostearate, amides such as stearic acid amide and stearic acid ethanolamide, amines such as alkyldimethylamine oxide, N-higher alkyl hydroxyalkyl carbamates such as N-dodecylhydroxyethyl carbamate, and SULFOBETAINES ® such as alkyl amino propyl sulfonic acids. Preferred stabilizers are ammonium salts of the higher saturated fatty acids such as ammonium stearate, ammonium palmitate, ammonium myristate and the like. The stabilizer used may comprise from 0.1 to 10.0% by weight of the liquid composition, preferably 0.4 to 7.0%.

In some embodiments, a wetting agent may be used. Suitable wetting agents are the adduct of 6 moles of ethylene oxide with trimethyl nonanol, the adducts of about 7 or 9 moles of ethylene oxide with the mixed $C_{11}$ to $C_{15}$ linear secondary alcohols or with the $C_{11}$ to $C_{16}$ primary alcohols, the adduct of 9 moles of ethylene oxide with nonylphenol; the silicone wetting agents of the structure

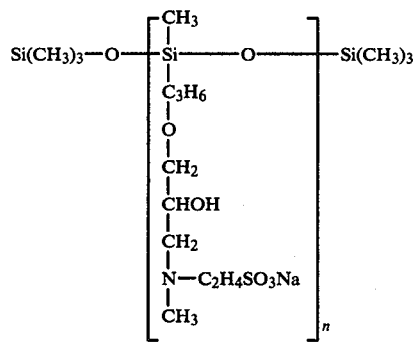

$n = 2-5$

Also useful are the commercially available fluorocarbon wetting agents such as the known perfluoroalkyl surfactants. In some formulations, the foaming agent may also serve as the wetting agent.

The amount of such wetting agent to be added to provide properties of the foams will vary depending upon the particular wetting agent selected. The wetting agent used may comprise from 0.01 to 5.0 weight, preferably 0.06 to 1%.

An essential aspect of the invention is the use of a pseudoplastic additive such as a polysaccharide. The preferred pseudoplastic additive is heteropolysaccharride-7. This compound is disclosed in U.S. Pat. No. 3,915,800 to Kang, which patent is hereby incorporated by reference in its entirety in this disclosure. The pseudoplastic additive increases the viscosity of the liquid in the foam bubble walls thereby allowing control of drainage and foam collapse (fluidity). However, when the composition passes through a foaming device where the liquid composition is subjected to shear, the apparent viscosity of the liquid is greatly reduced due to the presence of the pseudoplastic additive. This makes possible the good flow characteristics necessary for proper foam formation. Other materials useful as pseudoplastic additives include scleroglucan gums and xantham gums.

The pseudoplastic material may comprise from 0.02 to 0.5% by weight of the liquid composition, preferably 0.06 to 0.20%.

In lieu of separate foaming agents, stabilizers and wetting agents, blended foaming agents may be used in lieu thereof, such as High Expansion Foam Concentrates of National Foam Systems, Inc.

The following examples of specific formulas serve to further illustrate the invention. All formulas (foamable ink compositions) were foamed with the mixing device described hereafter and illustrated in the drawing. Where indicated each foamed ink was introduced into a press fountain. The foamed ink was transferred from the press fountain and applied as a coating on the surface of a gravure-type cylinder with a rotating brush being employed to insure uniform foam application. The foam coating was doctored in order to convert the foam bubbles into thin discrete membranes of ink composition covering or spanning the cells of the cylinder while allowing the land areas between cells as well as the air volumes underlying the membranes to remain substantially free of ink. The cylinder was then brought into contact either with a moving web of paper, as in a conventional rotogravure printing process, or a transfer roll forming part of a flexographic printing apparatus, and upon contact the pigment was transferred to the paper or transfer roll.

Except as otherwise noted, the foamed ink was coated on a modified Helioengraved solvent cylinder. The cylinder was modified by reducing the cells 35% in depth. The details of the specific cylinder and method of application need not be described in detail in this application.

Certain processes and apparatus for employing the foamable ink composition of the present invention are the subject of separate applications assigned to the same assignee as that of the present invention, and such applications are hereby incorporated by reference in their entireties in this disclosure.

In the following examples, the phrase "successfully coated" means that the specific foamed ink composition was transferred either directly or indirectly onto a moving web to produce a desired pattern or coating free of streaks or skips.

EXAMPLE I

| % Solids | |
|---|---|
| 10.00 | pigment (1123) |
| 10.00 | resin (5011) |
| 0.45 | high expansion foam concentrate (FOAM) |
| 5.00 | stabilizer (STAB) |
| 0.08 | wetting agent (L-7129) |
| 0.10 | pseudoplastic (PP) | pigment 1123: 100% Sunsperse Yellow YFD-1123 (35% solids) Sun Chemical Corp.
resin 5011: vinyl acrylic latex emulsion Stanchem, Inc. 5011 (55% solids)
high expansion foam concentrate: High Expansion Foam, National Foam Systems, Inc.
stabilizer: 100%, ammonium stearate Diamond Shamrock (33% solids)
wetting agent: silicon surfactant L-7129 Union Carbide
pseudoplastic: 50% by weight Kelco K8A13 (heteropolysaccharride-7) slurried in 150% by weight Butyl Carbitol ® - Union Carbide Corp.

The listed components were mixed with water resulting in a water-based formulation which was part solution, part emulsion and part slurry. The formula was foamed and successfully coated on a paper web.

EXAMPLE II

| % by Weight | |
|---|---|
| 38.93 | water |
| 0.07 | PP |
| 24.00 | resin 5011 |
| 0.30 | NH4OH |
| 28.60 | pigment 1123 |
| 5.00 | STAB |
| 0.40 | FOAM |

3.30% NH4OH was added to the above formula to adjust the pH to 10.0 and the formula foamed and successfully coated on a paper web.
Expansion ratio: 6.3
25% drainage: 41 minutes

EXAMPLE III

The formula of Example II was used except the NH4OH was 0.30% resulting in a pH of 9.3. The formula was successfully coated on a paper web in two runs.

| | Expansion ratio | 25% drainage |
|---|---|---|
| Run 1 | 8.1 | 82 min |
| Run 2 | 6.8 | 73 min |

One liter of the formula of Example III had dilute HCl 10N added to bring the pH to 7.0.
Expansion ratio: 6.0
25% drainage: 56 min
The formula was successfully coated on a paper web.

EXAMPLE V

The formula of Example II was used except that 0.75% HCl 10N was initially used in lieu of NH4OH. The pH was 6.5 and NH4OH was added to bring the pH to 7.5.
Expansion ratio: 6.0
25% drainage: 57 min
The formula was successfully coated on a paper web.

EXAMPLE VI

The formula of Example II was used except no NH4OH was used and the water % was 41.93%.
pH: 8.9
Expansion ratio: 9.5
25% drainage: 146 min
The formula was successfully coated on a paper web.

EXAMPLE VII

The formula of Example II was used except no NH4OH was used and 0.6% HCl 10N was used. The formula was successfully coated on a paper web in two runs.

| | pH | |
|---|---|---|
| | Expansion ratio | 25% drainage |
| Run 1 | 5.2 | 35 min |
| Run 2 | 5.2 | 36 min |

In examples II-VIII, the pH of a basic formulation was varied. Although all formulas were successfully coated, the foam characteristics varied. Example II was most satisfactory with uniform foam. The foams of Examples III-VII commenced to grow, i.e. became less fluid. Additionally, the foams of Examples IV, V and VII were characterized by large blow through bubbles.

EXAMPLE VIII

The formula of Example VI was extended with the following base, equal amounts by weight.

| Base | |
|---|---|
| % by Weight | |
| 67.53% | H$_2$O |
| 0.07% | PP |
| 24.00% | resin 5011 |
| 5.00% | STAB |
| 0.40% | FOAM |

The formula of Example VII was mixed with the following thinner, equal amounts by weight

| Thinner | |
|---|---|
| % by Weight | |
| 94.5% | H$_2$O |
| 0.1% | pseudoplastic |
| 5.0% | stabilizer |
| 0.4% | FOAM |

The color intensity of the coated web was varied by extending the pigment with the base and the thinner, respectively. Both formulas were successfully coated on a paper web.

EXAMPLE IX

The formula of Example II was used except that H$_2$O was 60.93% and the resin was reduced from 24% to 5%.
pH: 9.6
Expansion ratio: 7.3
25% drainage: 183 min
After several runs with foams of high resin content as in Example II, it was found that resin was beginning to plug the cells of the cylinder. This formula with low resin content was successfully coated on a paper web.

EXAMPLE X

The formula of Example II was used. To 48 lbs of this formula was added 2 lbs of NH$_4$OH. The formula was foamed and the expansion ratio increased from 5.1 to 7.0 which was not objectional.

EXAMPLE XI

The following formula (low resin) was compared with the formula of Example X to compare growth of the respective foams.

| Pounds | |
|---|---|
| 28.00 | H$_2$O |
| 0.03 | PP |
| 2.00 | resin 5011 |
| 2.00 | STAB |
| 8.00 | pigment 1123 |

The expansion ratio increased from 6.3 to 8.9 and the foam was not as satisfactory as the foam of Example X.

In regard to growth, neither formula was tranferred to a paper web or transfer roll.

EXAMPLE XII

| % by Weight | |
|---|---|
| 61.0 | H$_2$O |
| 5.0 | resin 5011 |
| 28.6 | pigment F-122 |
| 0.4 | FOAM |
| pigment: | F-122 35% carbon black pigment/5.6% Nitrile Resin (Atromax-Vivitone)/59.4% water |
| pH: | 9.4 |
| Expansion ratio: | 6.8 |
| 25% drainage: | less than 10 minutes |

This formula did not incorporate the psuedoplastic (PP). The 25% drainage time of 10 minutes was unacceptable. Once the foam collapsed in the fountain, it could not be refoamed in the fountain to embody the properties of the original foam.

EXAMPLE XIII

The formula of Example XI was used except water was 60.93% and the pseudoplastic additive PP was 0.07%.

| | |
|---|---|
| pH | 9.6 |
| Expansion ratio | 7.4 |
| 25% drainage | less than 94 minutes |

The formula of Example XII was successfully coated on a paper web.

EXAMPLE XIV

| % by Weight | |
|---|---|
| 54.93 | H$_2$O |
| 0.07 | PP |
| 5.00 | STAB |
| 28.00 | pigment 1123 |
| 0.40 | FOAM |
| 11.00 | resin (678) |

Initially, some resin settled out. NH$_4$OH added to redissolve the resin.
pH: 10.3
Expansion ratio: 7.2
25% drainage: 24 minutes
The formula was successfully coated on a paper web.

EXAMPLE XV

| Grams | |
|---|---|
| 23,153.0 | H$_2$O |
| 26.6 | PP |
| 1900.0 | resin 5011 |
| 1900.0 | STAB |
| 10,868.0 | pigment F-122 |
| 152.0 | FOAM | pH 9.6 originally; NH$_4$OH added to bring pH to 10.6. The formula was successfully coated on a transfer roll.

EXAMPLE XVI

In the aforementioned successful runs, it was found that after approximately 30 minutes, the color tended to lose its intensity. The following three runs were conducted to determine if resin content affected the color intensity.

| Formula | % by Weight | | |
|---|---|---|---|
| | A | B | C (Extender) |
| water | 19.93 | 19.93 | 40.53 |
| PP | 0.07 | 0.07 | 0.07 |
| STAB | 7.00 | 7.00 | 7.00 |
| resin | 44.00 (C55) | 52.00 (C55) | 52.00 (C55) |
| FOAM | 0.40 | 0.40 | 0.40 |
| pigment (1123) | 28.60 | 28.60 | — |

Formulas A & B were run as shown. Formula A was extended 50% by weight with Formula C. The formulas A, B and A/C were coated successfully on a paper web. However color intensity faded over extended periods of time.

EXAMPLE XVII

| Weight % | |
|---|---|
| 54.8 | H$_2$O |
| 0.2 | PP |
| 11.0 | resin FJC-55 |
| 28.6 | pigment 1123 |
| 0.4 | FOAM |
| 5.0 | ethylene glycol |
| pH | 10.0 |
| surface tension: | 36.9 dynes cm$^{-1}$ |
| Expansion ratio: | 12.4 |
| 25% drainage: | 35 minutes |

The ammonium stearate (STAB) used in prior formulations was deleted. Ethylene glycol was added as a foam conditioner and the amount of pseudoplastic material was increased to 0.20%. Although the foam lacked consistency, the formula was coated successfully on a paper web. No change in color intensity was noted after a run of 1½ hours. No indication of growth was noticed.

EXAMPLE XVIII

1% silicone surfactant (L-7129) was added to the formula of Example XVII. The addition of the surfactant resulted in a uniform foam. The formula was successfully coated on a paper web. No change in color intensity or growth in one hour.

| pH | 9.9 |
|---|---|
| surface tension | 33.0 dynes cm$^{-1}$ |
| Expansion ratio | 6.4 |
| 25% drainage | 32 minutes |

EXAMPLE XIX

The formula of example XVII was modified by increasing the weight percent of the resin from 11.0% to 20.0% and correspondingly decreasing the water content from 54.8% to 45.8%. This formula was successfully coated on a paper web. No change in color intensity was noted.

EXAMPLE XX

The formula of Example XIX was modified by adding 1% silicone surfactant (L-7129). This formula was successfully coated on a paper web. The foam had the following characteristics:
pH: 10.0
surface tension: 35.9 dynes cm$^{-1}$ 25% drainage: 33 minutes
No change in color intensity and very little foam growth.

EXAMPLE XXI

| % by weight | |
|---|---|
| 46.60% | H$_2$O |
| 0.20% | PP |
| 5.00% | ethylene glycol |
| 20.00% | resin FJ-C55 |
| 28.60% | pigment 1123 |
| 0.60% | FOAM |
| 0.05% | surfactant L-7129 |

This formula was successfully coated on a paper web. No change in color intensity.

EXAMPLE XXII

| % by Weight | |
|---|---|
| 20.00 | pigment F-122 |
| 0.20 | PP |
| 2.70 | NH$_4$OH |
| 10.00 | FJC-55 |
| 5.00 | ethylene glycol |
| 61.00 | H$_2$O |
| 0.60 | FOAM |
| 0.05 | surfactant L-7129 |
| 0.01 | perfluorocarboxylic acid |

The perfluorocarboxylic acid has the formula:

$$C_nF_{2n+1}COOH$$

where n=5–12.

The perfluorocarboxylic acid was added to reduce the surface tension of the foam. The formula was successfully coated on a transfer roll.

It was discovered that for the formulas of Examples XVII-XXII (no 'stabilizer') that the color as printed was uniform in intensity for the duration of a run. With ammonium stearate in the formulas, as a run continued, the color would begin to lose its intensity necessitating the addition of pigment periodically during a run.

When the foams made with the formulas containing ammonium stearate collapsed they formed a 'ghost' foam. When using the formulas with the 'stabilizer', it was desirable to have a long 25% drainage time.

It was further discovered with the formulas less the 'stabilizer' that as the foam collapsed, the liquid ink was held interstitially and a ghost foam was not formed. These collapsed foams could be refoamed to their original state, i.e. have the same physical and chemical properties including the same 25% drainage time. With these formulas then a long 25% drainage time is not as important as with the formulas containing 'stabilizers'.

The formulas I-XII were formed in the mixing device illustrated in the drawing.

Referring to the drawing, a mixing device is shown at 10 and includes a housing 12 having an inlet conduit 14 and a mixing chamber 16. A nozzle fitting 18 is secured to the housing 12. The fitting 18 has an orifice 20 (1/16" d) which communicates with the chamber 16. A receiver fitting 22 is secured to the housing 12. The fitting 22 has an inlet orifice 24 (3/6" d) which communicates with the chamber 16 and is axially aligned with and spaced-apart from the orifice 20.

The exemplary liquid compositions were introduced into the conduit 14 at ambient temperature, a flow rate of between 0.05 to 3.0 gal/min, and under a pressure of between 50–150 psig. Compressed ambient air was introduced into the valve 18 and discharged into the mixing chamber 16. In the mixing chamber turbulence is created due to the venturi effecting good mixing of the liquid with the air. The liquid-air mixture flowed through the valve 22 into a foam refining tube (not shown) and ultimately to a fountain. The flow rate of the compressed air was controlled such that the volume of foamed ink composition to the liquid formulation may vary between 6 to 1 to 12 to 1.

The components of the liquid compositions may range between a lower limit of one-fifth to an upper limit of twice the stated amounts of the examples, either alone or in any combination.

The liquid compositions of the Examples may have a viscosity unsheared at 1000–20,000 cp; and a sheared viscosity of 1–100 cp measured at a shear rate of 1000 $sec^{-1}$. In Example I the viscosities were measured at approximately 2000 cp and 40 cp, respectively.

The foams generated had a surface tension of between 15 to 40 dynes/cm and a range of bubble size diameter of between 5–100,000 microns.

Having described the invention, what is claimed is:

1. In a liquid ink composition for use in printing on a paper-like substrate comprising a synthetic resin, a pigment and a foaming agent, the improvement which comprises:
a polysacharride admixed in an amount of 0.02–0.50% solids by weight and said liquid composition in an amount sufficient to impart to said composition pseudoplastic properties such that when said composition is subjected to shear, the viscosity of said liquid composition is reduced by a factor of between 10–20,000 measured at a shear rate of 1,000 $seconds^{-1}$, whereupon when said liquid composition is converted to a foam and said foam is thereafter subjected to mechanical shear, the pseudoplastic properties of the liquid composition in the foam bubble walls control the foam stability and fluidity to thereby inhibit collapse of the foam.

2. The composition of claim 1 wherein the polysaccharide is selected from the group consisting essentially of xanthan gums and scleroglucan gums.

3. The composition of claim 2 wherein the xanthan gum is heteropolysaccharide-7.

4. The composition of claim 1 further characterized in that when the composition is applied to a curved surface having mutually spaced open cells therein the thus applied foam is convertible for doctoring into a plurality of discrete membranes of ink composition which overlie the cells, leaving the cell volumes overlying said membranes as well as the surface areas of the cells substantially free of ink.

5. The composition of claims 1 or 4 wherein the ink pigment and the resin together comprise between about 4–40% solids by weight, the foaming agent is between about 0.8–8.0% solids by weight.

6. The composition of claim 5 wherein the additive is heteropolysaccharide-7.

7. The composition of claim 6 wherein the additive is slurried in a solvent and the solvent is diethylene monobutyl ether.

8. The composition of claim 1 wherein the foaming agent is selected from the group consisting of ethylene oxide adducts of the mixed $C_{11}$ to $C_{15}$ linear secondary alcohols, ethylene oxide aducts of the linear primary alcohols having from 10 to 16 carbon atoms in the alcohol moiety, ethylene oxide adducts of the alkyl phenols wherein the alkyl group has from 8 to 12 carbon atoms, fatty acid alkanolamides, sulfosuccinate ester salts, N-cocobeta-aminopropionic acid, stearyl dimethyl benzyl ammonium chloride, the betains or quaternized tertiary alkylamines, sodium lauryl sulfate and sodium lauryl ether sulfate.

9. The composition of claim 1 which includes a wetting agent of between about 0.02–0.16% solids by weight, said agent selected from the group consisting of perfluoroalkyl surfactants, the adduct of 6 moles of ethylene oxide and trimethyl nonanol, the adducts of about 7 or 9 moles of ethylene oxide with the mixed $C_{10}$ to $C_{16}$ linear secondary alcohols or with the $C_{11}$ to $C_{15}$ primary alcohols, the adduct of moles of ethylene oxide with nonylphenol, and the silicone wetting agents of the structure:

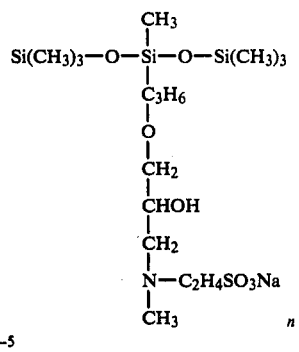

$n = 2-5$

10. The composition of claim 1 wherein the resin is selected from the group of latices consisting of acrylate ester homopolymers vinyl acetate homopolymers acrylate ester-vinyl copolymers and/or melamine-formaldehyde resins.

11. The composition of claim 1 which includes a stabilizer in an amount of between about 0.14–1.4% solids by weight wherein said stabilizer is selected from the group consisting of higher fatty alcohols, the higher alkyl monoethers, fatty monoglycerides, amides, amines, N-higher alkyl hydroxylalkyl carbamates, alkyl ammonium sulfonic acid betaines, and ammonium salts of the higher saturated fatty acids.

12. The composition of claim 1 wherein the expansion ratio of the foam is between 20 to 3.

13. The composition of claim 1 wherein the expansion ratio of the foam is between 6 to 12.

14. In a foamed ink for use in printing on a paper-like substrate comprising a water based composition of a synthetic resin, a pigment and a foaming agent, and a gas admixed with the water based composition in a ratio of from 20 volumes of gas to one volume of liquid to 3 volumes of gas to 1 volume of liquid formulation, the improvement which comprises a polysacharride admixed with said composition in an amount of 0.02 to 0.50% solids by weight to impart to said foamed ink pseudoplastic properties wherein when said foam is subjected to mechanical shear, the pseudoplastic properties of the liquid composition in the foam bubble walls control foam stability and fluidity to thereby inhibit collapse of the foam.

15. The composition of claim 14 wherein the polysaccharide is selected from the group consisting essentially of xanthan gums and scleroglucan gums.

16. The composition of claim 14 wherein the xanthan gum is heteropolysaccharide-7.

17. The composition of claim 14 further characterized in that when the composition is applied to a curved surface having mutually spaced open cells therein the thus applied foam is convertible by doctoring into a plurality of discrete membranes of ink composition which overlie the cells, leaving the cell volumes overlying said membranes as well as the surface areas of the cells substantially free of ink.

18. The composition of claim 14 wherein the ink pigment and a resin together comprise between about 4–40% solids by weight, the foaming agent is between about 0.8–8.0% solids by weight.

19. The composition of claim 14 which includes a stabilizer in an amount of between about 0.14–1.4% solids by weight wherein said stabilizer is selected from the group consisting of higher fatty alcohols, the higher alkyl monoethers, fatty monoglycerides, amides, amines, N-higher alkyl hydroxylalkyl carbamates, alkyl ammonium sulfonic acid betaines, and ammonium salts of the higher saturated fatty acids.

20. The composition of claim 14 which includes a wetting agent of between about 0.02–0.16% solids by weight, said agent selected from the group consisting of perfluoroalkyl surfactants, the adduct of 6 moles of ethylene oxide with trimethyl nonanol, the adducts of about 7 or 9 moles of ethylene oxide with the mixed $C_{10}$ to $C_{16}$ linear secondary alcohols or with the $C_{11}$ to $C_{15}$ primary alcohols, the adduct of moles of ethylene oxide with nonylphenol, and the silicone wetting agents of the structure:

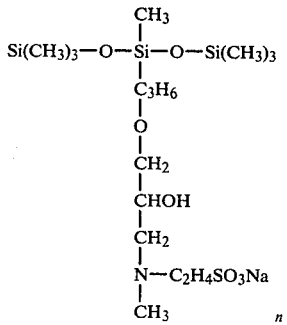

$n = 2-5$

21. The composition of claim 14 wherein the resin is selected from the group of latices consisting of acrylate ester homopolymers vinyl acetate homopolymers acrylate ester-vinyl copolymers and/or melamine-formaldehyde resins.

22. The composition of claim 14 which includes a stabilizer in an amount of between about 0.14–1.4% solids by weight wherein said stabilizer is selected from the group consisting of higher fatty alcohols, the higher alkyl monoethers, fatty monoglycerides, amides, amines, N-higher alkyl hydroxylalkyl carbamates, alkyl ammonium sulfonic acid betaines, and ammonium salts of the higher saturated fatty acids.

23. The composition of claim 14 wherein the expansion ratio of the foam is between 20 to 3.

24. The composition of claim 14 wherein the expansion ratio of the foam is between 6 to 12.

25. The composition of claim 14 further characterized in that when the foam originally formed with the composition collapses it holds the liquid ink interstitially and can be refoamed to a foam having substantially the same properties as the original foam.

26. A method of foaming a liquid formable ink composition for use in printing on a paper-like substrate, said composition comprising a water-based ink including; a pigment and a synthetic resin together comprising between about 4–40% solids by weight, a foaming agent between about 0.1–8.0% solids by weight, and a polysaccharride of between about 0.2–0.5% solids by weight to impart pseudoplastic properties to said composition, the composition when converted to a foam and the foam thereafter is subjected to shear, the pseudoplastic properties of the liquid composition in the foam bubble walls control the foam stability and fluidity to thereby inhibit collapse of the foam, which includes:

(a) indroducing said composition into a mixing chamber;

(b) introducing an inert gas into the mixing chamber, the volume of the inert gas to composition being about 20 to 1 to 3 to 1;

(c) effecting a mixing of the composition and the gas, the viscosity of the composition being reduced by a factor of 10 to 20,000, which results in a dispersion of the formulation in the gas; and (d) expanding the dispersion to form a foam having a bubble size diameter of between 5–100,000 microns, and a surface tension of 15–40 dynes $cm^{-1}$.

27. The method of claim 26 wherein the volume of the gas to composition is between 6 to 12.

28. The method of claim 26 wherein the composition and gas are introduced into the mixing chamber at substantially uniform pressures.

29. The method of claim 26 further characterized in that when the foam originally formed with the composition collapses it holds the liquid ink interstitially and includes refoaming the foam whereby it has substantially the same properties as the original foam.

30. The method of claim 26 wherein the polysaccharide is selected from the group consisting essentially of xanthan gums and scleroglucan gums.

31. The method of claim 26 wherein the xanthan gum is heteropolysaccharide-7.

* * * * *

UNITED STATES PATENT AND TRADEMARK OFFICE
CERTIFICATE OF CORRECTION

PATENT NO. : 4,482,648
DATED : 13 November 1984
INVENTOR(S) : Edward C. Norman

It is certified that error appears in the above-identified patent and that said Letters Patent are hereby corrected as shown below:

Column 11, line 32, cancel "and" and insert therefor --with--

Signed and Sealed this

Thirteenth Day of August 1985

[SEAL]

Attest:

DONALD J. QUIGG

Attesting Officer

Acting Commissioner of Patents and Trademarks